United States Patent [19]

Finegold

[11] Patent Number: 4,616,788
[45] Date of Patent: Oct. 14, 1986

[54] METHOD AND APPARATUS FOR WINDING DYNAMOELECTRIC DEVICES

[75] Inventor: Hyman B. Finegold, Dayton, Ohio

[73] Assignee: The Globe Tool & Engineering Co., Dayton, Ohio

[21] Appl. No.: 698,246

[22] Filed: Feb. 5, 1985

[51] Int. Cl.⁴ ............................................ H02K 15/09
[52] U.S. Cl. ..................................... 242/7.03; 29/598; 242/7.05 B
[58] Field of Search ................. 242/7.03, 7.05 B, 7.13, 242/7.14; 29/598, 605

[56] References Cited

U.S. PATENT DOCUMENTS

| | | |
|---|---|---|
| 1,500,181 | 7/1924 | Chapman . |
| 2,306,855 | 12/1942 | Allen ............................... 242/7.05 B |
| 2,670,145 | 2/1954 | Biddison . |
| 2,895,690 | 7/1959 | Savard . |
| 3,006,564 | 10/1961 | Hambleton ..................... 242/7.05 B |
| 3,098,616 | 7/1963 | Eminger ......................... 242/7.05 B |
| 3,101,910 | 8/1963 | Turk ............................... 242/7.05 B |
| 3,361,371 | 1/1968 | Dickensheets et al. . |
| 3,776,397 | 12/1973 | Hoy et al. ......................... 214/8.5 K |
| 3,785,580 | 1/1974 | Kennedy et al. ............... 242/7.05 B |
| 4,320,564 | 3/1982 | Aida et al. ............................. 29/33 |
| 4,335,856 | 6/1982 | Fuzita ............................. 242/7.05 B |

FOREIGN PATENT DOCUMENTS

| | | |
|---|---|---|
| 3318623A1 | 12/1983 | Fed. Rep. of Germany . |
| 810112 | 6/1955 | United Kingdom . |
| 2123860 | 2/1984 | United Kingdom . |

Primary Examiner—Billy S. Taylor
Attorney, Agent, or Firm—Roger S. Dybvig

[57] ABSTRACT

Coils of wire having different geometries are wound onto the same dynamoelectric device core or onto cores having different geometries utilizing a flier-type winding machine having a winding form or forms provided with two sets of differently configured wire guide surfaces and rotated to be selectively oriented to wind coils of one geometry or the other. Such rotation may be accomplished by rotation of the flier with which the form is associated. A center guide assembly having two selectively operable guide members is also disclosed.

16 Claims, 21 Drawing Figures

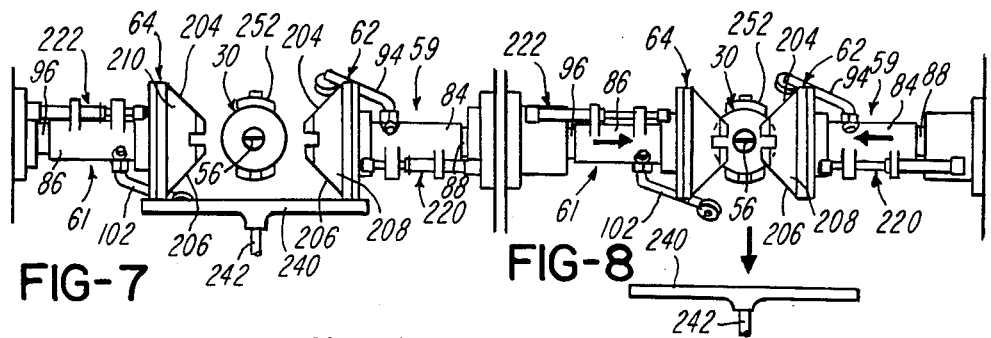
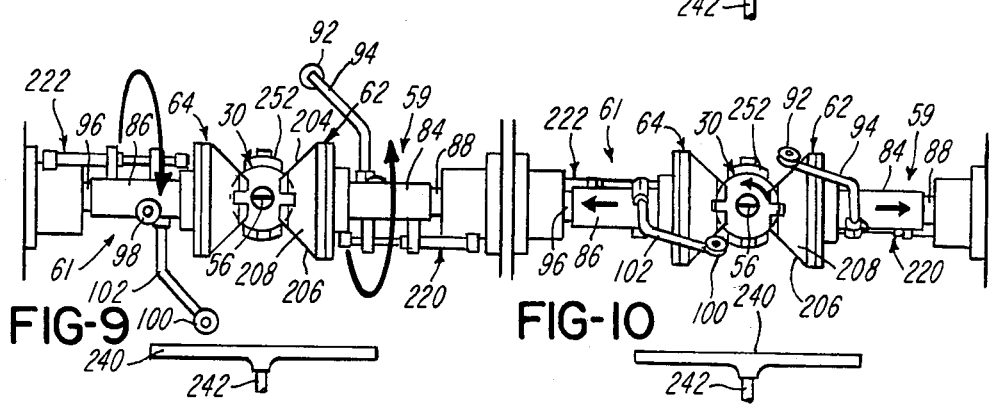
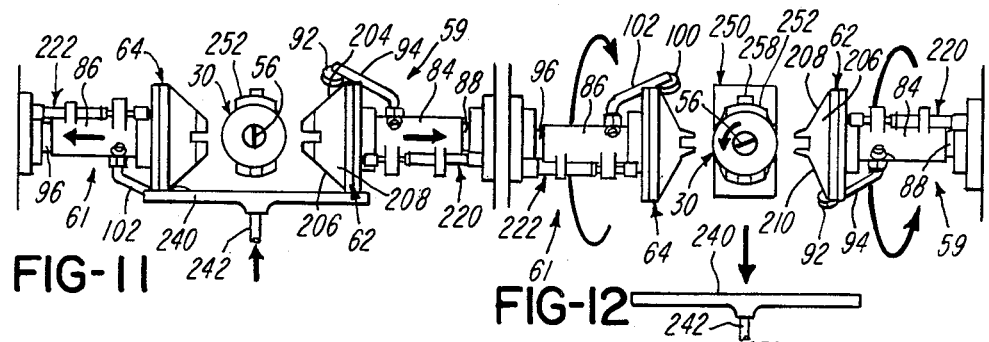
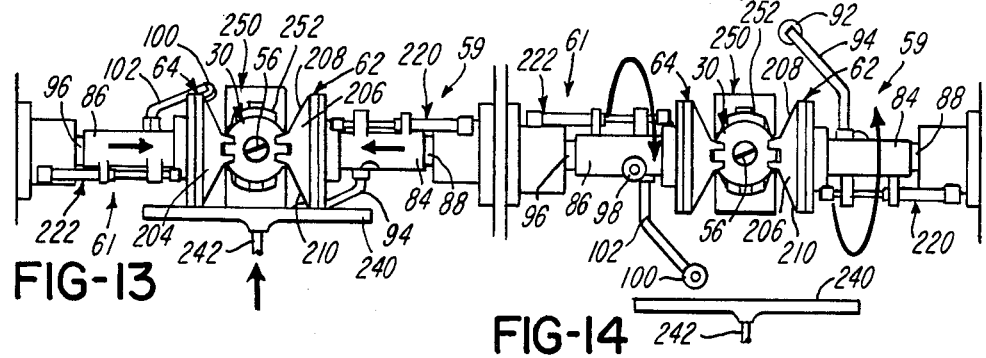

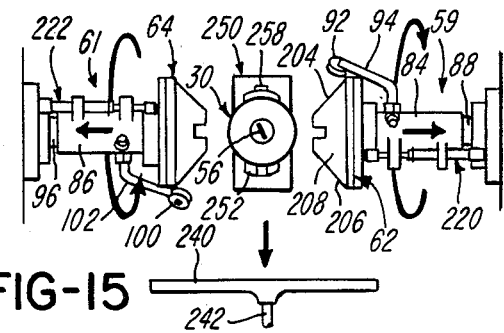

METHOD AND APPARATUS FOR WINDING DYNAMOELECTRIC DEVICES

SUMMARY OF THE INVENTION

This invention relates to a method and an apparatus for winding dynamoelectric devices and particularly such devices having radially outwardly opening coil-receiving slots. Such dynamoelectric devices may comprise either stators or rotors depending upon the configuration of the motor, generator or the like with which they are to be used.

This invention involves flier-type winding machines that are most generally used for winding armatures but are also occasionally adapted to wind stators. These machines are normally tooled to wind coils having a predetermined length and width into the coil-receiving slots of armature cores or stator cores having a predetermined geometry. A state-of-the-art winding machine can be electrically set up to change automatically the number of turns of wire in the coils being wound but tooling changes must be made to change from the winding of a coil having a first length and width (or slot span) to one having a different length and/or width. At a minimum, if there is a need to wind coils having different geometries, it is necessary to change the winding form (or forms in the case of double flier winding machines) used to guide the wire exiting from the flier into the coil-receiving core slots.

An object of this invention is to provide a method for winding coils having different geometries utilizing a flier-type winding machine and requiring minimal changeover time for the machine to be converted from being operable to wind a coil having one geometry to be operable to wind a coil having a different geometry. A related object of this invention is to provide an improved flier-type winding machine capable of winding coils having different geometries utilizing a single set of tooling so that minimal changeover time is required to convert from the winding of a coil of one geometry to the winding of a coil having a different geometry.

A further object of this invention is to provide improved tooling for a flier-type winding machine including an improved winding form that may be used to wind coils having differing geometries. More specifically, this invention provides a winding form having two differently configured sets of wire guiding surfaces and means for selectively positioning such sets relative to the core being wound and to the flier with which the form is used so that coils having differing geometries can be selectively wound.

A more specific object of this invention is enable a rapid change in the positions of the wire guide surfaces in response to a rotary movement of the flier.

In some cases, a center wire guide assembly is provided that cooperates with the winding forms to guide the wires into the core slots. Another object of this invention is to provide an improved center wire guide assembly for use in winding coils having different geometries.

It is believed that those familiar with the art of armature and stator winding machines will readily recognize that this invention provides an inexpensive way to rapidly change from the winding of a coil of one geometry to a coil having a different geometry. The invention is readily applicable either to winding coils having different geometries on the same core or to winding coils having different geometries on cores having different geometries. In either case, the time and expense of removal and replacement of the winding form or forms is avoided. No tooling replacement whatsoever is required for winding differently shaped coils on the same core and often will not be needed for winding differently shaped coils on cores having different dimensions.

Other objects and advantages will become apparent from the following description.

BRIEF DESCRIPTION OF THE DRAWINGS

FIGS. 7 through 15 are generally diagrammatic front elevational views illustrating a portion of the machine shown in FIG. 1 and illustrating, in sequence, the operation of the machine to completely wind a stator core in accordance with this invention.

FIG. 16 is an end elevational view on a larger scale of an unwound stator core of the type shown in FIGS. 1–4, and a mounting shaft therefor.

17, 18 and 19 are end elevational views similar to FIG. 16 but showing, in simplified form, the coil windings produced in accordance with this invention at the end of the operations illustrated respectively in FIGS. 9, 11 and 15 above.

Figure 20:
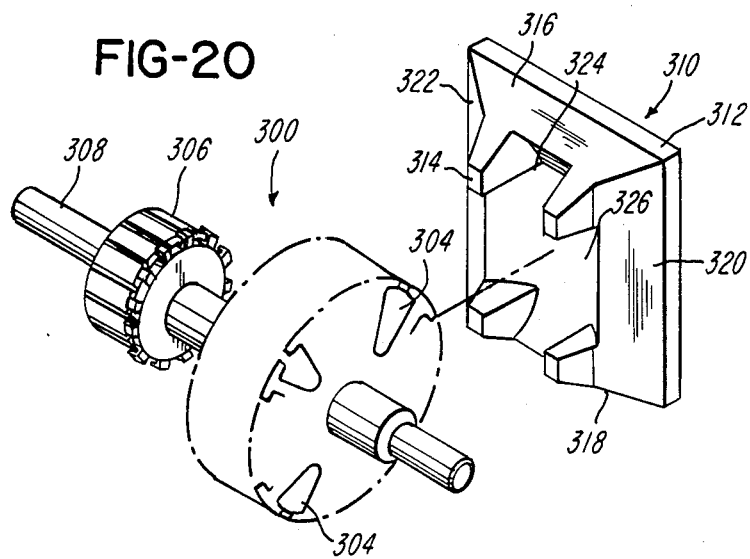
Figure 21:
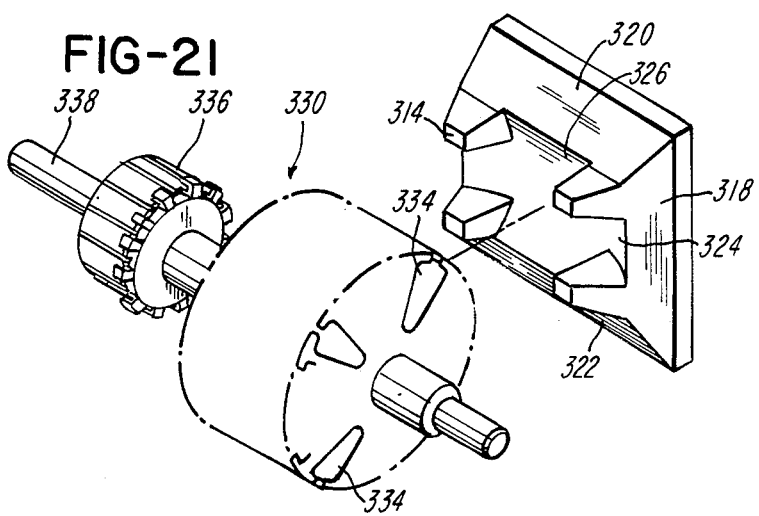

FIGS. 20 and 21 are simplified, exploded perspective views illustrating a modification.

DESCRIPTION OF THE PREFERRED EMBODIMENTS

This invention is concerned with a method and apparatus for winding dynamoelectric devices, and particularly such devices having radially outwardly opening coil-receiving slots. Such devices may comprise either stators or rotors depending upon the configuration of the motor with which they are to be used. Those familiar with flier-type winding machines will recognize that the invention described herein involves flier-type winding machines most typically used for winding armatures having a core on a shaft, as will be described in connection with FIGS. 20 and 21 below. A method and apparatus will first be described, however, in connection with the winding of a disc-like stator core, generally designated 30 (see FIGS. 4 and 16), having a central bore 32 and plural circumferentially spaced and radially outwardly opening slots 34 separated by generally radially extending teeth, alternately numbered 36 and 38. Often the slots and teeth of dynamoelectric devices are uniformly shaped and sized. In the particular stator core 30 shown in the drawings, the radially extending legs of the teeth 36 are wider than the legs of the teeth 38. With reference to FIG. 19, the stator core 30 is designed to receive a first set of coils 40, each of which spans across two adjacent teeth 36 and 38, and a second set of coils 42, each of which is coiled about the narrower radially extending leg of a tooth 38. As will become apparent, this invention may also be used to wind dynamoelectric devices having different geometries. Thus, the particular geometry of the stator core 30 forms no part of this invention.

Figure 4:
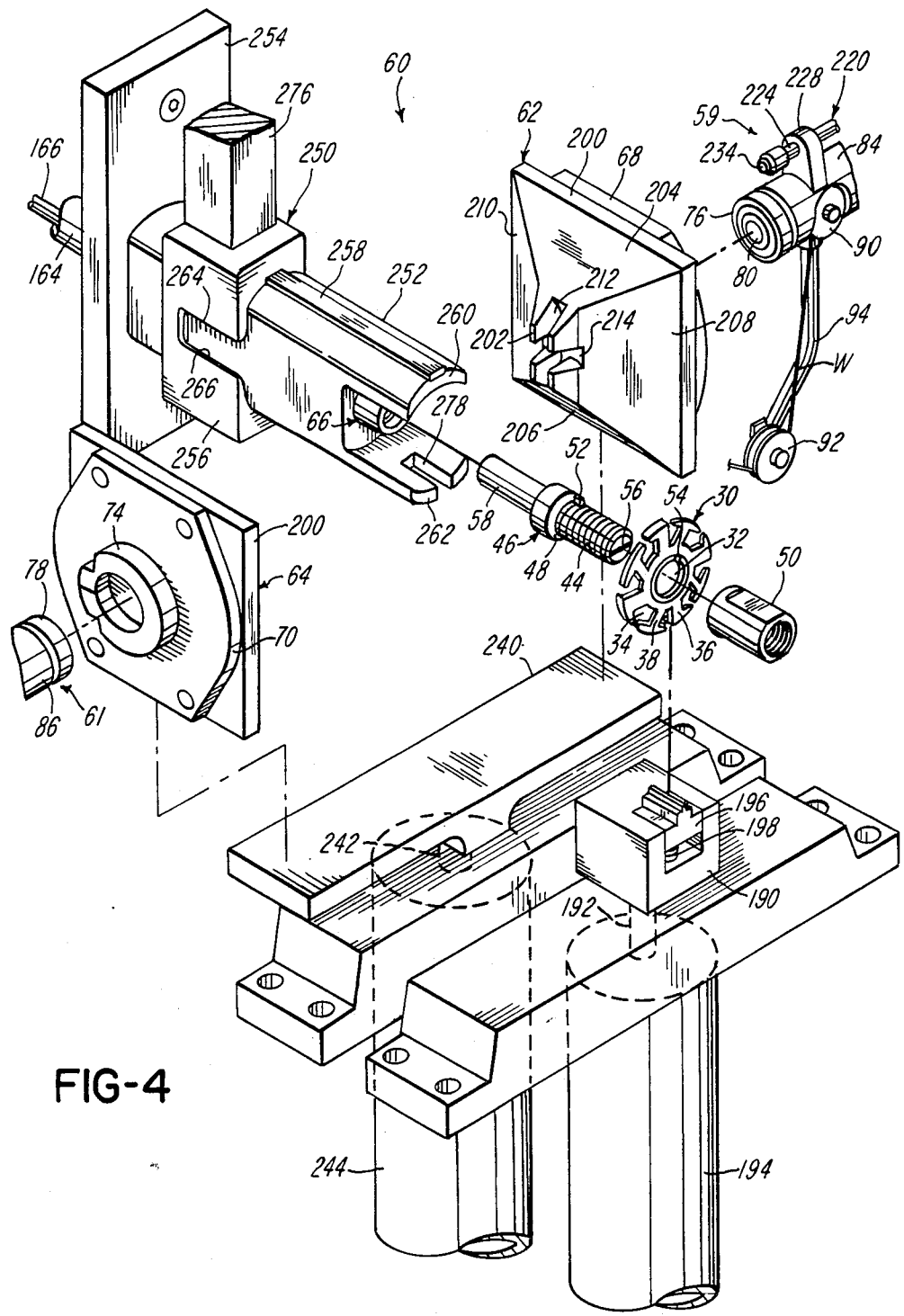
FIG. 4 is an enlarged, fragmentary, exploded perspective view, with parts broken away, showing elements of the machine of FIG. 1 and an unwound stator core and a mounting shaft therefor.

With reference to FIG. 4, to prepare the stator core 30 for winding, it is slipped over a threaded end 44 of a stator mounting shaft 46 and abutted against a shoulder 48 centrally located on the shaft 46 against which it is clamped by a nut 50 screwed onto the threaded end 44. The rotary position of the stator core 30 relative to the mounting shaft 46 is determined by the interengagement between a key 52 formed on the shaft 46 adjacent the shoulder 48 and a notch 54 extending from the stator bore 32. This rotary position is indicated by an alignment line 56 marked on the end surface of the threaded shaft end 44. When the stator core 30 is assembled onto the mounting shaft 46, the resultant assembly resembles an unwound armature which may be wound on an armature winding machine, the smooth end portion, designated 58, of the shaft 46 opposite the threaded end 44 being adapted to be gripped by a conventional collet clamp assembly utilized for gripping and holding armatures at the winding station.

In reference to FIGS. 1–4, a winding machine in accordance with the present invention comprises a double flier winding machine, generally designated 60, having a right side flier 59, a left side flier 61, and a pair of winding forms, namely, a right side winding form 62 and a left side winding form 64. The winding forms 62 and 64 are adapted to guide wire into spaced slots 34 of a stator core 30 supported therebetween by a collet clamp assembly 66 that grips the smooth end portion 58 of the stator mounting shaft 46.

Figure 1:
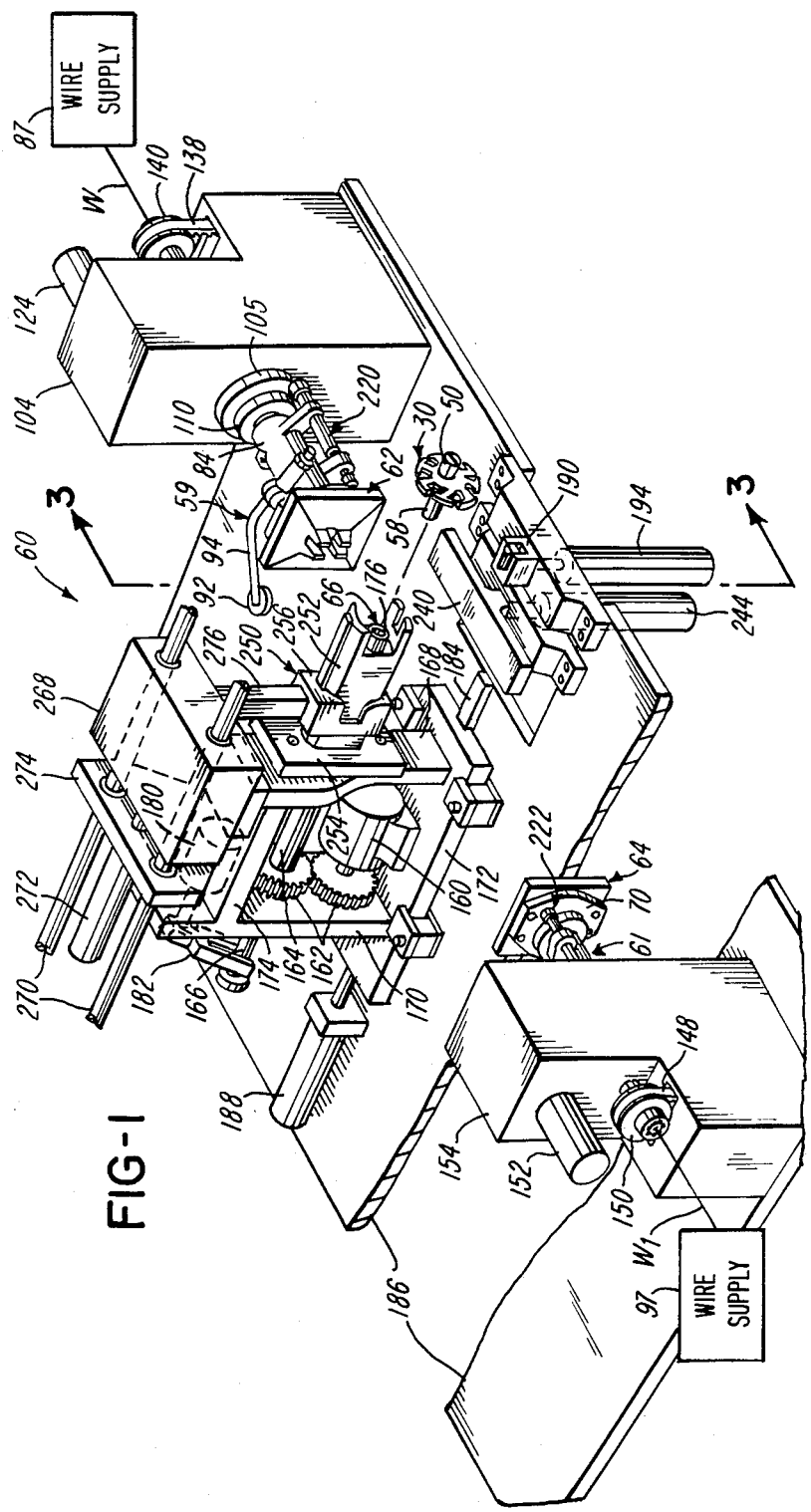
FIG. 1 is a fragmentary, perspective view, with parts broken away, showing a winding machine embodying the present invention and a stator core which may be wound thereby.
Figure 2:
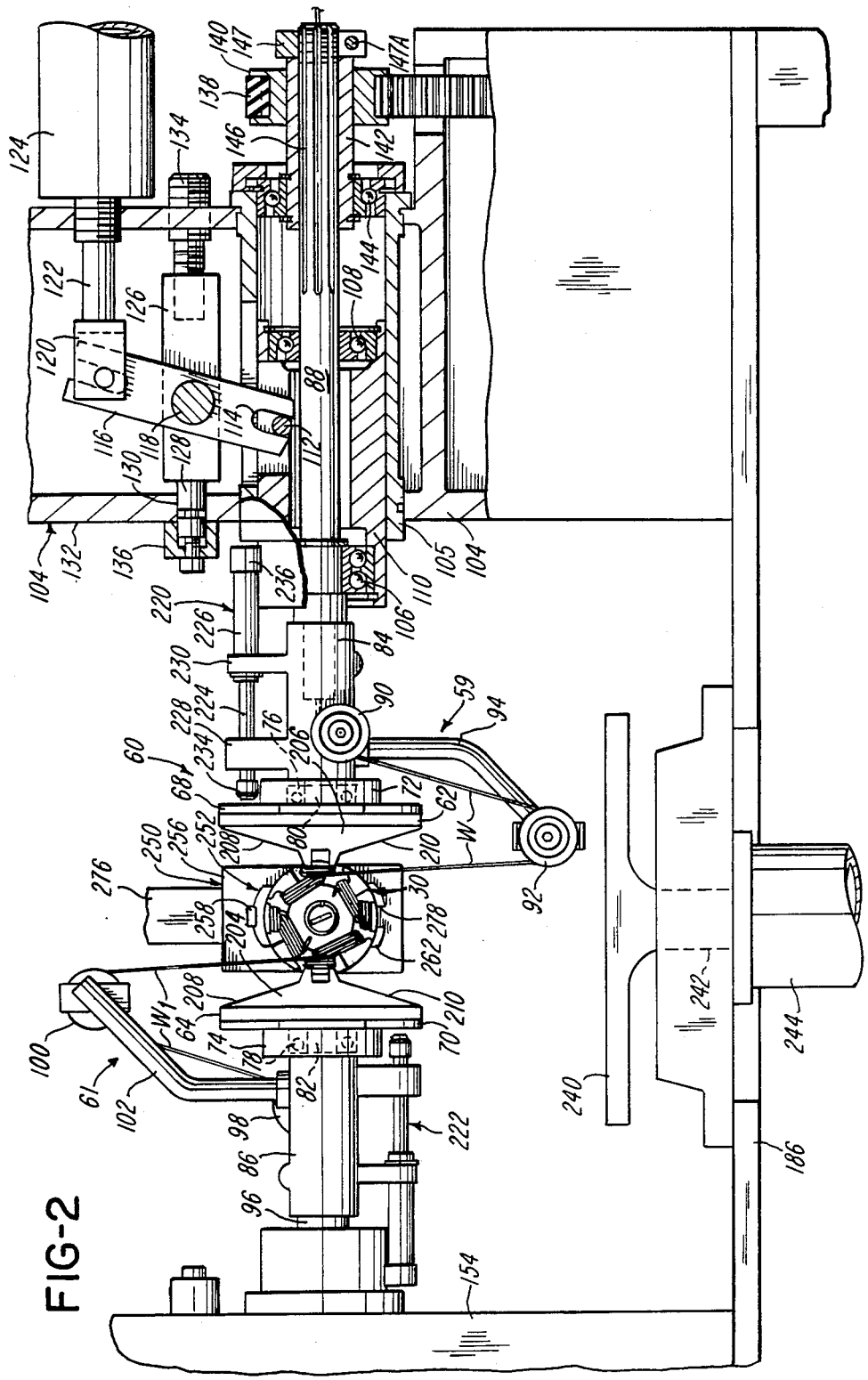
FIG. 2 is an enlarged, fragmentary front elevational view with parts broken away and parts shown in cross-section of the winding machine of FIG. 1, and showing a wound stator core in the winding station.

With special reference to FIGS. 2 and 4, the winding forms 62 and 64 are mounted upon mounting plates 68 and 70, respectively, having clamping collars 72 and 74, respectively, which grip the outer races of bearings 76 and 78, respectively, which are mounted on stub pintles 80 and 82, respectively, formed on flier hubs 84 and 86, respectively. The right side flier hub 84 is clamped or otherwise affixed to a right side flier spindle 88 through which wire W from a source of wire under tension extends. The wire supply is not shown but is diagrammatically indicated by box 87 in FIG. 1. The wire W exits from the flier hub 84 around an exit pulley 90 and a flier pulley 92 at the end of a flier arm 94. The left side flier hub 86 is similarly affixed to a left side flier spindle 96 and wire, designated $W_1$, from another source of wire under tension 97 (FIG. 1) exits from the left side spindle 96 around exit pulley 98 and a flier pulley 100 at opposite ends of a flier arm 102.

The flier spindles 88 and 96 are rotated about their common axis so that the wires W and $W_1$ are guided over surfaces of the winding forms 62 and 64 into pairs of spaced slots 34 for forming coils therein. The spindles 88 and 96 are also moved axially toward and away from one another to appropriately position the winding forms 62 and 64 relative to the stator core 30 being wound. Mechanisms for rotatably and axially driving flier spindles are well known to those familiar with the art and form no part of this invention. FIG. 2 illustrates a simplified form of one such mechanism associated with a right side spindle 88. Thus, the spindle 88 extends through a drive housing 104 in which a spindle sleeve 105 is affixed. To move the flier spindle 88 axially toward or away from the stator core 30, the spindle 88 is mounted for rotation in a pair of bearings 106 and 108 affixed to opposite ends of a cylindrically shaped motion transmitting member or spindle quill 110 slidably mounted in the spindle sleeve 105. The member 110 has a drive pin 112 affixed thereto engaged within a slot 114 at the lower end of a drive lever 116 pivotally mounted on a pivot pin 118. The opposite end of the drive lever 116 is connected by a clevis 120 to the end of a piston rod 122 of an air operated, double-acting cylinder 124.

The cylinder 124 may be actuated to cause the cylindrical shaped motion transmitting member 110 to move in a direction along the length of the axis of the flier spindle 88. The bearings 106 and 108 are axially fixed to both the spindle 88 and the spindle quill 110 so that axial movement of the quill 110 is transmitted to the spindle 88. A fine adjustment of the length of travel of the spindle 88 in response to a given movement of piston rod 122 may be obtained by an adjustment of the location of the pivot pin 118. For this purpose, the pivot pin is carried on a support block 126 having a reduced end portion 128 received in an aperture 130 in the front wall 132 of the drive housing 104. The pivot pin support block 126 can be moved fore and aft, as is apparent, by rotation of a threaded adjusting shaft 134. The housing aperture 130 is covered by an oil retaining cap 136 since the portion of the housing 104 within which axial drive elements described above are located is filled with oil for lubricating purposes.

Rotation is imparted to the right flier spindle 88 by means of a timing belt 138 engaging a pulley 140 that is affixed to a drive sleeve 142 journaled for rotation in a bearing 144 in the housing 104. The drive sleeve 142 has internal splines mating with an externally splined section 146 of the flier spindle 88. As apparent, rotation of the pulley 140 imparted by the timing belt 138 is directly transmitted to the flier spindle 88 and the flier arm 94. The end of the drive sleeve 142 most remote from the winding form 62 also serves as a stop which is engaged by a stop collar 147 on the spindle 88 to limit its travel when it is fully extended to bring the winding form 62 into engagement with the stator core 30. The stop collar 147 is threaded on the end of the spindle 88 to enable the stop position to be adjusted in order to accomodate for changes in clearance as the machine parts become worn through use. The collar 147 is split so that it may be fixedly clamped to the spindle 88 at any adjusted position by a clamp screw 147A extended through aligned bores therein located on the opposite sides of the split. The drive mechanism for the timing belt 138 is not illustrated or described herein since such may be entirely conventional. Samples of such drive mechanisms are disclosed in U.S. Pat. No. 3,382,729, granted to O. F. Steinke on Mar. 5, 1968, U.S. Pat. No. 4,163,931, granted to D. R. Seitz and M. T. Heaton on Aug. 7, 1979, the disclosures of which are incorporated herein by reference. The left side flier spindle 96 is moved axially and rotated about its axis in the same manner and by an essentially duplicate mechanism to that which drives the right side flier spindle 88. Since these mechanisms may be identical, the left flier drive mechanism is not separately illustrated, except for a timing belt 148 and a pulley 150 shown in FIG. 1, which function identically to the timing belt 138 and pulley 140, and a double-acting air cylinder 152 that functions identically to the cylinder 124. However, it should be noted that, as conventional, the left side flier spindle is rotated in a direction opposite to the right side flier spindle in the sense that the right side flier will rotate in a top-coming direction when the left side flier is rotating in a top-going direction, as viewed from the front of the machine, or vice versa. It will be noted that, for purposes of illustration, the drive for the left flier 61 is shown housed in a housing 154 separate from the housing 104 for the right flier drive. This is a simplification that will be understood by those familiar with double flier winding machines. In usual practice, the flier drives are supported by a common casting constructed to maintain the flier spindles 88 and 96 accurately aligned on a common axis that passes centrally through the core to be wound. Also, the rotary drive mechanisms for the two flier spindles are preferably, but not necessarily, coupled together by a cross-shaft as disclosed in the aforementioned U.S. Pat. Nos. 3,382,729, and 4,163,931, and the representation in FIG. 1 is substantially simplified in this respect.

Figure 3:
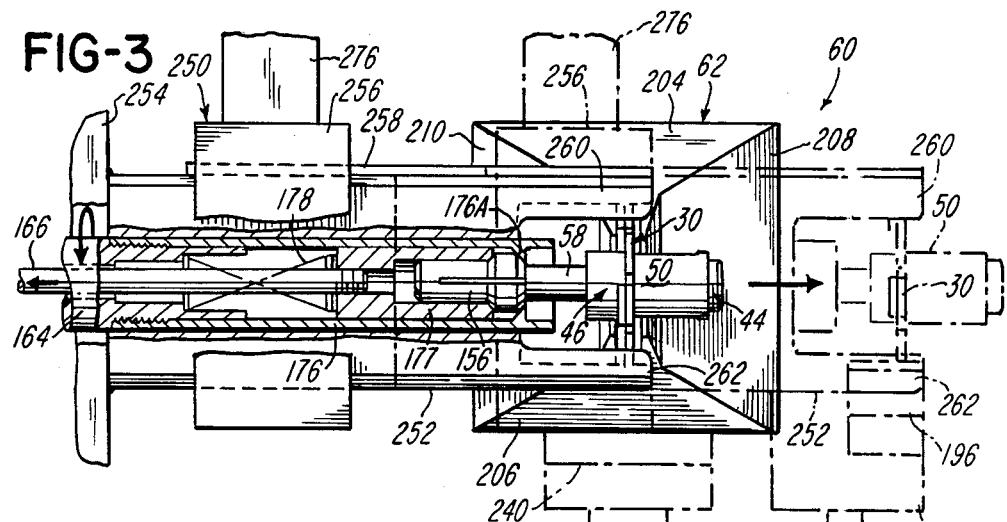
FIG. 3 is an enlarged, fragmentary view of the machine of FIG. 1, with parts broken away, taken generally along line 3—3 thereof.

In preparation for winding the stator coils 40 and 42, the smooth end portion 58 of the stator shaft 46 is inserted into the clamp assembly 66 and clamped by a split collet 156 (FIG. 3). During the winding cycle, the stator core 30 must be rotated about its axis as necessary to properly align its coil receiving slots 34 with the winding forms 62 and 64. Various forms of rotator devices have been used in armature winding machines and may be used in the machine 60. The details of construction and operation of such devices form no part of this invention. One such rotator device is shown for example in U.S. Pat. No. 3,673,878, issued to J. M. Biddison on July 4, 1972, the disclosure of which is incorporated herein by reference. (The Biddison patent also discloses a clamp assembly that could be used herein.)

An example of a rotator device is shown in FIG. 1 that includes a stepping motor 160 which, through gears 162, drives a hollow rotator spindle 164 that slidably receives a collet clamp rod 166. The rotator spindle 164 is appropriately mounted for rotation about the axis of the collet 156 and accordingly, the stator core 30 supported thereby. Thus, the spindle 164 is mounted within front and rear frame plates 168 and 170, respectively, of a rotator support frame including a frame base plate 172 and a frame top plate 174. A hollow, tubular collet retainer 176 having an internal flange 176A engaging the forward end of the collet 156 is affixed to the front end of the rotator spindle 164. The collet retainer 176 is biased by a spring assembly 178 toward the collet 156 so that the collet 156 is thereby biased to grip the stator mounting shaft 46. Gripping pressure on the collet 156 is released to permit insertion and removal of the stator mounting shaft 46 by operation of an air operated collet release cylinder 180 that is connected to the collet clamp shaft 166 by a link 182. Reference is hereby made to the above mentioned Biddison U.S. Pat. No. 3,673,878, from which the operation of the clamp assembly 66 and the rotator device will be made amply apparent. Microprocessor control systems are now being used to control the operation of rotator stepping motors such as motor 160 and those familiar with the art will recognize that such a system could be used in lieu of the cam system disclosed in the Biddson '878 patent. Since rotator devices are now common in the industry, further description thereof is believed unnecessary.

With continued reference to FIG. 1, the rotator frame base plate 172 is slidably guided by a key 184 for movement along a horizontally oriented frame plate 186 and adapted to be reciprocated therealong by operation of an air actuated collet positioning cylinder 188. As those familiar with the art will be well aware, the purpose of the slidable mounting of the rotator frame base plate 172 is to permit the clamp assembly 66 to be thrust forwardly i.e., to the right as shown in FIG. 1, so that successive stator cores mounted on stator mounting shafts 46 may be conveniently manually removed and inserted into the clamp assembly 66. At all other times, the collet positioning cylinder 188 causes the rotator frame to be retracted so that the clamp assembly 66 will be appropriately positioned to locate the stator core 30 between the winding forms 62 and 64 for coils to be wound thereon.

When a stator mounting shaft 46 is first inserted into the clamp assembly 66, the stator core 30 may be properly angularly positioned as follows. At such time, a stator locating head 190 mounted on the piston rod 192 of a locator cylinder 194 is extended upwardly adjacent to the clamp assembly 66. The locator head 190 carries a locating key 196 that is spring biased upwardly by a coil spring 198. As the operator advances the stator mounting shaft 46 into the collet 156, the operator holds the stator mounting shaft 46 with its alignment line 56 horizontally oriented and with the lowermost coil-receiving slot 34 aligned with the locating key 196. The proper angular position of the stator core 30 is thus assured. The locating head is not needed except when a mounting shaft 46 carrying an unwound core 30 is inserted into the clamp assembly 66. The locating head 190 is, at other times, positioned well below the winding station by operation of the locator cylinder 194 so that it is out of the way when the fliers are rotating to wind coils. Accordingly, the locating head 190 is retracted by operation of the locator cylinder 194 promptly after a mounting shaft 46 carrying an unwound stator core 30 is fully inserted into the clamp assembly 66. Those familiar with flier-type armature winding machines will recognize that other locating devices which may be conventional, and which, for example, may be partly mounted within one of the winding forms, could be used in lieu of the locator mechanism 192, 194, 196, and 198.

The winding machine as thus far described may be entirely conventional, except for the construction of the winding forms 62 and 64. Conventional winding forms have vertically oriented side plates with polished wire guiding surfaces for guiding wires into a single pair of core slots in a core having a single predetermined length. Thus, conventional winding forms are usable only for the winding of coils onto a core having a specified length and for the winding of coils into slot openings spaced apart by a specific angle. In accordance with this invention, a winding form has two sets of wire guide surfaces usable for winding coils having different geometries with respect to either one or both of the lengths of the core (and, accordingly, the lengths of the coil sides) and the angles between the openings to the slots in which the coils are wound. The two sets of wire guide surfaces are angularly offset from one another so that only one set of guide surfaces is used to guide the wires into the core slots at any one time. The other set can be placed in use by the simple expedient of rotating the form.

With reference to FIG. 4, the right side winding form 62 comprises a prismoidal shaped body having a larger, square base 200 and a smaller, rectangular base 202. The bases 200 and 202 are connected by a first pair of substantially identical, oppositely facing, sloping wire guide faces 204 and 206 and a differently configured second pair of substantially identical, oppositely facing, sloping wire guide faces 208 and 210. The first pair of sloping wire guide faces 204 and 206 join the smaller base 202 at a spacing identical to the span between a pair of core slots 34 that receive a coil 40. A core-receiving slot 212 is formed centrally through the smaller base 202 and the adjacent portions of the first pair of wire guide faces 204 and 206 so that a stator core 30 can be located partly within the slot 212 when the longer span coils 40 are being wound. Accordingly, as the right side flier 59 rotates to wind a longer span coil 40, the wire W exiting therefrom slides along the first wire guide faces 204 and 206 and is guided thereby into the appropriate core slots 34.

It will be noted in FIG. 4 that a second core-receiving slot 214 extending transversely to the first core-receiving slot 212 is formed centrally of the smaller base 202 and the adjacent portions of the the second pair of sloping wire guide faces 208 and 210. When a shorter span coil 42 is to be wound, the winding form 62 is repositioned, as will be described below, to receive the stator core 30. As is apparent, the second pair of wire guide faces 208 and 210 are spaced apart at the smaller base 202 by a spacing equal to the spacing between the openings to the coil-receiving slots 34 on opposite sides of a single one of the stator teeth 38 so that the second pair of wire guide faces 208 and 210 will guide the wire therein as the right side flier 59 rotates.

The left side winding form 64 is constructed substantially identically to the right side winding form 62 and like parts thereof are referred to by like reference characters. It will be realized that the depictions of the sloping wire guide faces 204, 206, 208 and 210 and the slots 212 and 214 represent approximations of the actual shapes of these features. Those familiar with the construction of flier-type winding machines will appreciate that winding forms of this type may require substantial finishing work as needed to accurately guide the wires W and $W_1$ into the appropriate coil-receiving slots 34 and to protect the wires from unwanted engagement with surfaces of the core 30 which could abrade them. Such finishing work would include the rounding of all edges formed by intersections of the winding form surfaces to assure the entry of the wire into the core slots without scraping the wire insulation.

Figure 5:
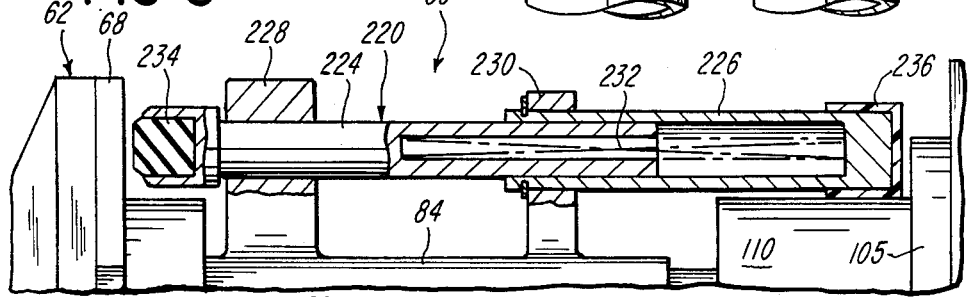
FIG. 5 is an enlarged, fragmentary view, with parts broken away, of a portion of the machine of FIG. 1 and illustrating a brake assembly.
Figure 6:
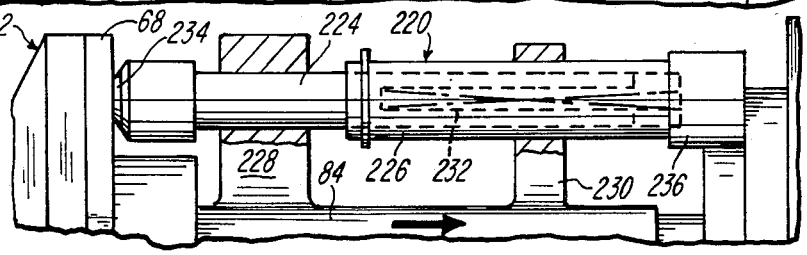
FIG. 6 is an enlarged, fragmentary view similar to FIG. 5, but showing the parts at a different interval of time in the operation of the machine.

As mentioned above, the winding forms 62 and 64 are rotatable with respect to the flier hubs 84 and 86, respectively. To prevent the winding forms 62 and 64 from rotating during the winding of coils, they are pressed against the outer margin of the stator core 30 by operation of the air cylinders 124 and 152 that axially move the flier spindles 88 and 96. When the winding forms 62 and 64 are separated by operation of the air cylinders 124 and 152 to permit the stator core 30 to be rotated to present new slots in position to receive coils, rotation of the right side winding form 62 is prevented by a right side brake assembly 220 and rotation of the left side winding for 64 is prevented by a left side brake assembly 222. The construction of the brake assemblies 220 and 222 may be entirely conventional, such brake assemblies being in common use in double flier armature winding machines. With reference to FIGS. 1, 2, 5 and 6, the right side brake assembly 220 comprises a pair of telescoping tubes, namely an internal tube 224 and an external tube 226. The internal tube 224 is slidably mounted within a mounting block 228 forming part of the flier hub 84 and the external tube 226 is slidably mounted within another mounting block 230 forming part of the flier hub 84. The tubes 224 and 226 are located between the form mounting plate 68 and the housing 104 and are so mounted that they are slidable along a common axis that is parallel to the axis of rotation of the flier spindle 88. As shown in FIG. 5, a coil spring 232 housed within the tubes 224 and 226 biases their opposite ends apart so that the combined length of the two tubes 224 and 226 is nearly as great as the separation between the form mounting plate 68 and the confronting face of the spindle sleeve 105 when the winding form 62 is pressed against the stator core 30. Upon retraction of the winding form 62 by axial movement of the flier spindle 88 to the right as viewed in FIG. 2, the confronting face of the form mounting plate 68 engages the free outer end 234 of the internal tube 224 causing the opposite end 236 of the external tube 226 to engage the housing 104. As movement of the winding form 62 to the right as viewed in FIG. 5 continues, the spring 232 is compressed as shown in FIG. 6 so that firm pressure is applied by the tube end 234 to the form mounting plate 68. The tube end 234 is preferably made from a brake lining material to enhance the resistance to motion of the winding form 62 relative to the flier 59. The opposite end 236 of the external tube 226 that bears against the spindle sleeve 105 may have a low friction plastic cap or coating as illustrated in FIG. 5 to permit non-abrasive relative sliding movement between such end 236 and the spindle sleeve 105. The left side brake assembly 222 is preferably identical to the right side brake assembly 220 and is, therefore, not further described herein.

The position of winding forms such as forms 62 and 64 relative to the dynamoelectric device being wound is usually quite critical. For this reason, the machine 60 is provided with a horizontally oriented winding form locator plate 240 which is mounted on a piston rod 242 driven by an air operated form locator positioning cylinder 244 for vertical movement toward and away from the winding forms 62 and 64. During intervals in which the fliers 59 and 61 are rotating to wind coils, the form locator plate 240 is positioned substantially beneath the winding station as shown in FIG. 2. At other times, such as will be described below, it is extended upwardly into engagement with the lower edges of the winding forms 62 and 64 so as to insure their proper orientation.

Winding forms, such as forms 62 and 64, often constitute the only wire guiding elements used in flier type winding machines. In some cases, especially when the coil-receiving slots in which a coil is to be wound are relatively closely spaced, wire guides, known as center wire guides, are located generally between the winding forms. The winding machine 60, as illustrated in FIGS. 1 through 4, is provided with a center wire guide assembly generally designated 250 having a first, inner wire guide member 252 affixed to a mounting plate 254 supported on the rotator front frame plate 168. The center guide assembly 250 further includes a second, outer wire guide member 256 slidably mounted on the inner guide member 252 and guided for movement therealong by a key 258.

The inner guide member 252 has arcuate guide plates 260 and 262 extending over and under, respectively, a stator core 30 clamped in the winding station. The confronting edges of the arcuate plates 260 and 262 are are so spaced that they are aligned with the opposite edges of the teeth defining the openings to the slots 34 in which the longer span coils 40 are wound. The second, outer guide member 256 has similar confronting edges, designated 264 and 266 (FIG. 4), aligned with the corresponding edges of the openings to the core slots 34 in which the smaller span coils 42 are wound. The outer guide member 256 is retracted away from the winding forms 62 and 64 when the longer span coils 40 are being wound and is extended along the axis of the collet 156 into operative location between the winding forms 62 and 64 for winding the smaller span coils 42. For this purpose, a guide carriage 268 (FIG. 1) is slidably mounted on a pair of frame supported guide rods 270 and positioned therealong by an air operated guide positioning cylinder 272 mounted on a frame plate 274 on top of the rotator frame assembly. The carriage 268 has a depending drive rod 276 affixed to the top of the second guide member 256, the operation of which is apparent. It may be noted that a notch 278 is formed in the lower arcuate guide plate 262 into which the locating key 196 projects when the clamp assembly 66 is moved to the stator core loading and unloading position as shown by phantom lines in FIG. 3.

A method by which coils 40 and 42 are wound onto a stator core 30 is illustrated in FIGS. 7 through 15. In FIG. 7 the winding forms 62 and 64 are spread apart to permit the insertion of an unwound stator into the winding station. Here it may be noted that, to avoid a confusion of lines, the stator core 30 in FIGS. 7 through 15 is shown as a circular, unslotted element and the wires W and W₁ are not illustrated. The unwound stator core 30 illustrated in FIG. 7 would, if completely shown, have the same appearance as the stator core 30 in FIG. 16.

When the stator core 30 is inserted into the winding station, the form locator plate 240 is elevated to engage the lower edges of the winding forms 62 and 64. It remains in this position while the winding forms 62 and 64 are moved toward one another and into engagement with the stator core 30 by axial movement of the flier spindles 88 and 96 toward one another as indicated by the horizontal arrows in FIG. 8. Accordingly, the winding forms 62 and 64 slide along the top surface of the form locator plate 240 and are accurately positioned thereby as they move into engagement with the stator core 30. Thereafter, the form locator plate 240 is lowered by actuation of the cylinder 244 away from the winding station. The fliers 59 and 61 are then rotated in opposite directions, as indicated by the arrows in FIG. 9, whereupon the wires W and W₁ enter the core slots 34 aligned with the wire guide faces 204 and 206 and the adjacent edges of the arcuate center guide plates 260 and 262 to form a first pair of coils 40. For this purpose, the wire guide faces 204 and 206 respectively face upwardly and downwardly and the winding forms 62 and 64 are constructed to assist in winding the longer span coils 40 when so oriented. Upon completion of the first winding cycle, the fliers 59 and 61 come to rest. At this time a first pair of the longer span coils 40 are wound as illustrated in FIG. 17. With regard to the winding of the first pair of coils, it may be noted that the ends of the wires W and W₁ leading from the fliers 59 and 61 are held clamped by a clamp mechanism, which is not shown but which may be entirely conventional, located at the front of the winding station generally opposite the clamp assembly 66.

After the winding of the first pair of coils, the winding forms 62 and 64 are partly retracted, as indicated by the horizontal arrows in FIG. 10, to enable the stator core 30 to be rotated through 90 degrees to present second pairs of slots 34 in position to have the second pair of longer span coils 40 wound therein. The winding forms 62 and 64 need only be separated from the stator core 30 by a fraction of an inch to permit such rotation. Accordingly, the form locator plate 240 can remain in its lowered position. Of course, if unwanted rotation of the forms 62 and 64 were to occur, the form locator plate 240 could be elevated to retain the orientation of the forms 62 and 64.

After the stator core 30 is rotated through 90 degrees, the second pair of longer span coils 40 is wound. This completes the winding of the longer span coils 40 as shown in FIG. 18. Those familiar with the art will appreciate that the second pair of coils 40 may be wound in either the same direction as the first set of coils 40 or in opposite directions, depending upon the type of lead connections used.

In order to prepare for the winding of the shorter span coils 42, the winding forms 62 and 64 are separated by a distance sufficient to be clear of the stator 30 being wound by axial movement of the flier spindles 88 and 96 as indicated by the horizontal arrows in FIG. 11. Because of the substantial distance through which the forms 62 and 64 are thus moved, it is deemed desirable to move the form locator plate 240 upwardly into engagement with the lower edges of the forms 62 and 64 before the horizontal movement occurs, so that the forms slide therealong as they are separated.

After the winding forms 62 and 64 are fully separated from the stator core 30, the core 30 is rotated through an angle appropriate to place a pair of teeth 38 in position to have a pair of shorter span coils 42 wound thereabout and the forms 62 and 64 are rotated about the axis of the flier spindles 88 and 96 through a 90 degree angle to position the wire guide surfaces 208 and 210 so that they face vertically upwardly and downwardly, the forms 62 and 64 being constructed to assist in winding the shorter span coils 42 when so oriented. The forms 62 and 64 may be so rotated without obstruction since they are spaced from the core 30. The preferred method of rotating the forms 62 and 64 for this purpose is by rotating the fliers 59 and 61 through 90 degrees as indicated by the circular arrows in FIG. 12. Such rotation of the fliers causes the forms 62 and 64 to also rotate through 90 degrees because the fliers 59 and 61 and the forms 62 and 64 are coupled for movement together by the brake assemblies 220 and 222, respectively. Of course, to enable such rotation, the form locator plate 240 must be lowered out of the path of the fliers 59 and 61 as illustrated in FIG. 12. At about this time, the outer center guide member 256 is slidably moved into location between the winding forms 62 and 64. Immediately thereafter, the form locator plate 240 is again elevated to engage and thereby assure proper angular orientation of the forms 62 and 64 to wind the shorter span coils 42. With the locator plate 240 elevated, the forms 62 and 64 are returned into engagement with the stator core 30 by axial movement of the flier spindles 88 and 96 as illustrated in FIG. 13. The locator plate 240 is then lowered and a first pair of shorter span coils 42 is wound as shown in FIG. 14.

The succeeding operations of the machine to complete the winding of the coils 42 should be apparent. Briefly, the stator core 30 is rotated through 90 degrees in the manner described above with reference to FIG. 10, and the second pair of shorter span coils 42 is then wound, forming the wound assembly shown in FIG. 19. The second pair of shorter span coils 42 may also be wound in either the same or the opposite direction from the first, depending upon the electrical characteristics being sought. Thereafter, the forms 62 and 64 are again separated to completely clear the freshly wound stator core 30, with the stator locator plate 240 being preferably elevated to maintain their orientation. Thereafter, the locator plate 240 is lowered as illustrated in FIG. 15 and the fliers 59 and 61 are rotated to return the winding forms 62 and 64 to their initial orientation with the wire guide faces 204 and 206 facing upwardly and downwardly. The locator plate 240 is then again elevated, the outer center guide member 256 is retracted and the parts of the machine are thus returned to the positions thereof illustrated in FIG. 7. Of course, the wound armature is removed and replaced by an unwound armature in a manner already described.

As previously described, those faces or wire guiding surfaces of the forms 62 and 64 that face generally vertically upwardly and downwardly guide the wires into the core slots 34 as the fliers rotate. The horizontally facing guiding surfaces also perform a wire guiding function in that they straddle the core 30 adjacent the slots 34 and may prevent unwanted engagement between the wires and the core. In this sense, all four faces 204, 206, 208, and 210 function as guides when winding both sets of coils 40 and 42. Thus, it is recognized that one of the limits to the use of this invention is that both pairs of guiding suraces on the winding forms must, in the sense described herein, be usable for winding both sets of coils.

The form locator plate 240 would be unnecessary in the event means different from and more accurate than the fliers and the brake assemblies 220 and 222 were used to control the positions of the winding forms 62 and 64. Since the brake assemblies 220 and 222 are spring operated, and only frictionally engage the winding form mounting plates 68 and 70, there is a distinct possibility that the winding forms 62 and 64 will rotate out of position when they are separated from the stator core. The winding forms could also become misaligned when they are moved from one angular orientation to the other because they may not precisely rotate with the fliers. The angles through which the fliers rotate may also not be as accurately controlled as necessary to precisely reposition the winding forms. The form locator plate 240 provides a simple and inexpensive device for insuring that the winding forms 62 and 64 are accurately aligned with the stator core 30 and enables the positions of the forms 62 and 64 to be controlled using conventional fliers and brake assemblies for rotating them.

The locator plate 240 illustrated in the drawings has a flat, horizontal upper form-engaging surface because it is designed to engage the flat edges of the larger form bases 200. It will be understood that the form-engaging surfaces of the locator plate 240 could be made to any shape needed to mate with the surface portions of the winding forms engaged thereby, so that angular misalignment of the winding forms with the dynamoelectric device core being wound will be either corrected or avoided by engagement of the locator plate therewith.

It will be appreciated that the foregoing method will be varied as needed or desirable for winding different dynamoelectric devices. For example, the method could be practiced using a single flier machine with a single winding form corresponding to the forms 62 and 64. The method is equally applicable to stators or armatures having slots which would be wound with more than one coil and, of course, to such dynamoelectric devices wherein the rotation of the core to wind succeeding coils is other than 90 degrees.

FIGS. 20 and 21 show a modification in highly simplified form. FIG. 20 illustrates an armature 300 having a laminated armature core 302 with plural coil-receiving slots 304 and a commutator 306 mounted on an armature shaft 308. A winding form, generally designated 310, that may be used as described above for winding coils of wire into the core slots 304, comprises a prismoidal body having a larger, square base 312, a smaller, rectangular base 314, a first pair of oppositely directed wire guide faces 316 and 318 and a second pair of oppositely directed wire guide faces 320 and 322. The smaller base 314 and the first pair of wire guide faces 316 and 318 are provided with a centrally located, core-receiving slot 324. The base 314 and the second pair of wire guide faces 320 and 322 similarly have a central, core-receiving slot 326. The armature 300 shown in FIG. 20 can be wound using the form 310 oriented as shown in FIG. 20 with the first pair of wire guide faces 316 and 318 facing generally vertically. The form 310 would be sufficient itself for use in a single flier armature winder and it would be duplicated for use in a double flier armature winder. The winding form 310 is not rotated during the winding of the armature 300, the slot 324 being sized to receive the margins of the core 302 and the first pair of wire guide faces 316 and 318 being spaced and formed to guide wires upon rotation of a flier (not shown) into the appropriate core slots 304.

Because of the novel construction of the winding form 310, it may be rotated through 90 degrees to position the second pair of wire guide faces 320 and 322 in position to guide wire into an armature 330 shown in FIG. 21 which differs from the armature 300. Thus, the armature 330 has a laminated core 332 with coil-receiving slots 334, the core 334 having a different "stack height" or length than the core 302. The core 332 and a commutator 336 are mounted on an armature shaft 338. It will be noted that the core-receiving slot 326 formed in the second pair of wire guide faces 320 and 322 is wider than the first mentioned core-receiving slot 324 to accomodate the greater length of the core 332 shown in FIG. 21. The method and apparatus by which the form 310 may be rotated to position it either to wind the armature 300 or the armature 330 may be identical to that disclosed above in reference to FIGS. 1-15. Thus, it is seen that the use of the winding form 310 could enable a very rapid changeover of a flier-type winding machine from being capable of winding a core having a first geometry to a core having a second geometry.

The method of operation of the armature winder to wind the armatures 300 and 330 and the construction of the armature winder may be essentially the same as described above in connection with the machine 60. However, the machine would ordinarily be equipped to automatically form commutator connections between the coils and the commutators. See, for example, the aforementioned Biddison U.S. Pat. No. 3,673,878. Mechanism to automatically accomplish start and finish wire connections to the commutators would also typically be provided. Such mechanism is shown, for example, in U.S. Pat. No. 3,812,577, granted to J. L. Compton and D. R. Seitz on May 28, 1974.

Although the presently preferred embodiments of this invention have been described, it will be understood that within the purview of this invention various changes may be made within the scope of the following claims.

Having thus described my invention, I claim:

1. In a method of winding dynamoelectric devices having cores with radially outwardly opening coil-receiving slots utilizing a flier-type winding machine having a winding form for guiding wire exiting from a rotating flier into pairs of said coil-receiving slots, the steps of:

constructing said winding form with a first pair of wire guiding surface portions having edges adapted to be substantially aligned with the outward openings of a pair of said slots to guide wire into said pair of slots and with a second pair of wire guiding surface portions having edges adapted to be aligned with the outward openings of a pair of said slots to guide wire into said last mentioned pair of slots, said second pair of wire guiding surface portions having a configuration different from said first pair of wire guiding surface portions;

positioning said form with said first pair of wire guiding surface portions aligned with the outward openings of a pair of said slots and sufficiently close to said core to guide wire exiting from said flier upon rotation thereof into said slots;

with said form so positioned, winding one or more coils having a first geometry by rotating said flier;

repositioning said form by rotating it about the axis of rotation of said flier so that said second pair of wire guiding surface portions is aligned with the outward openings of a different pair of said slots and sufficiently close to said core to guide wire exiting from said flier upon rotation thereof into said last mentioned slots; and with said form so repositioned, winding one or more coils having a different geometry by rotating said flier.

2. The method of claim 1 wherein said flier is mounted on a spindle, and further including the step of mounting said winding form on the end of said spindle for rotation relative thereto, and the step of repositioning said winding form by rotating it about the axis of rotation of said flier is accomplished by releasably interconnecting said winding form and said flier so that rotation of said flier is imparted to said winding form and, while said flier is interconnected to said winding form, rotating said flier.

3. The method of claim 2 wherein said releasable interconnection between said winding form and said flier is accomplished by means including friction means, and said method further comprises providing powered winding form locator means and, after rotating said winding form and before winding a coil, engaging said winding form by said powered locator means to insure that said winding form is in a predetermined angular orientation and, if not, rotating said winding form by said locator means relative to said flier into said predetermined angular orientation.

4. The method of claim 2 comprising the further step of retracting said winding form from said core before said winding form is rotated so that said winding form may be rotated without obstruction.

5. The method of claim 1 wherein the angle of rotation of said flier to reposition said winding form is substantially 90 degrees.

6. The method of claim 5 wherein said flier is mounted on a spindle, and further including the step of mounting said winding form on the end of said spindle for rotation relative thereto, and the step of repositioning said winding form by rotating it about the axis of rotation of said flier is accomplished by releasably interconnecting said winding form and said flier so that rotation of said flier is imparted to said winding form and, while said flier is interconnected to said winding form, rotating said flier.

7. The method of claim 6 comprising the further step of retracting said winding form from said core before said winding form is rotated so that said winding form may be rotated without obstruction.

8. The method of claim 1 wherein coils of both geometries are wound into slots of one core, and said winding form is so constructed that, when said first pair of wire guiding surface portions is positioned in alignment with the outward openings of a pair of said slots of said core to guide wire exiting from said flier into said last mentioned pair of slots, said second pair of wire guiding surface portions straddles a marginal portion of said core, and said method further comprises the step of retracting said winding form from said core before said winding form is rotated so that said winding form may be rotated without being obstructed by said core.

9. The method of claim 1 wherein coils of said first geometry are wound on one or more dynamoelectric devices having a first predetermined configuration and coils of said second geometry are wound on one or more dynamoelectric devices having a second predetermined configuration different from said first configuration and wherein said step of repositioning said winding form is accomplished between the winding of the devices having the first configuration and the devices having the second configuration.

10. In an armature winding machine of the type having a flier, a spindle on which the flier is mounted, means for rotatably driving said spindle about a predetermined axis to cause coils of wire to be wound into spaced coil-receiving slots of cores of dynamoelectric devices, and a winding form for guiding wire wound by said flier into said slots, the improvement wherein said winding form has a first pair of wire guiding surface portions having edges adapted to be substantially aligned with the outward openings of a pair of said slots to guide wire into said pair of slots and a second pair of wire guiding surface portions fixedly spaced from said first pair of wire guiding surface portions and having edges adapted to be aligned with the outward openings of a pair of said slots to guide wire into said last mentioned pair of slots, said second pair of wire guiding surface portions having a configuration different from said first pair of wire guiding surface portions, and means for rotating said winding form about said axis for selectively positioning said first and said second pairs of wire guiding surface portions with their edges substantially aligned with the outward openings of a pair of said slots so that coils having different geometries may be wound.

11. The improvement of claim 10 wherein said machine comprises means mounting said spindle for movement along said axis and means are provided for moving said spindle along said axis to position said winding form closer to and further from said core.

12. The improvement of claim 11 further comprising a winding form locator means for preventing undesired rotation of said winding form when it is moved toward or away from said core and for correcting the angular orientation of said winding form in the event it becomes out of its proper angular orientation, said winding form locator means including means for engaging said form to prevent or corrrect rotation thereof and drive means for moving said form engaging means toward and away from said winding form.

13. The improvement of claim 10 further comprising a center wire guide assembly having guiding surfaces confronting said wire guiding surface portions of said winding form, said center wire guide assembly including a wire guide member movable from a first position adjacent said winding form for cooperating therewith to guide the wire into said slots to a second position remote from said winding form, and means for moving said wire guide member between its said first and second positions.

14. The improvement of claim 13 wherein said wire guide assembly further includes another wire guide member that remains adjacent said winding form, and said first mentioned wire guide member is slidably mounted on said another wire guide member.

15. For use in a flier-type machine for winding coils in coil-receiving slots of dynamoelectric devices, a winding form having two differently configured and mutually relatively fixed pairs of oppositely facing wire guiding surface portions adapted to be used for guiding wire into said coil-receiving slots, one of said pairs facing along a first axis and the other facing along a second axis intersecting said first axis, each of said pairs of surface portions being shaped to be substantially aligned with the outward openings of said coil-receiving slots so that said winding form may be oriented with either one of said two pairs of wire guiding surface portions substantially aligned with the outward openings of a pair of said coil-receiving slots.

16. The winding form of claim 15 wherein said first axis is 90 degrees from said second axis.

* * * * *